(No Model.) 6 Sheets—Sheet 1.

A. H. METCALF & C. S. GOODING.
SEWING MACHINE.

No. 469,374. Patented Feb. 23, 1892.

WITNESSES:
John R. Snow.
W. T. Elkins.

INVENTORS:
Arthur H. Metcalf
Charles S. Gooding
by their attorneys,
Maynadier & Read.

(No Model.) 6 Sheets—Sheet 2.

A. H. METCALF & C. S. GOODING.
SEWING MACHINE.

No. 469,374. Patented Feb. 23, 1892.

WITNESSES:
John R. Snow
W. H. Elkin.

INVENTORS:
Arthur H. Metcalf
and
Charles S. Gooding
by their attorneys (No Model.) 6 Sheets—Sheet 3.

A. H. METCALF & C. S. GOODING.
SEWING MACHINE.

No. 469,374. Patented Feb. 23, 1892.

WITNESSES:
John R. Snow.
W. N. Elkins.

INVENTORS.
Arthur H. Metcalf
and
Charles S. Gooding
by their attorneys (No Model.) 6 Sheets—Sheet 4.

A. H. METCALF & C. S. GOODING.
SEWING MACHINE.

No. 469,374. Patented Feb. 23, 1892.

WITNESSES:
John R. Snow.
W. T. Elkins

INVENTORS.
Arthur H. Metcalf
and
Charles S. Gooding
by their attorneys
Maynadier & Leach (No Model.) 6 Sheets—Sheet 5.

A. H. METCALF & C. S. GOODING.
SEWING MACHINE.

No. 469,374. Patented Feb. 23, 1892.

WITNESSES:
John R Snow.
W N Elkins.

INVENTORS:
Arthur H. Metcalf
and
Charles S. Gooding
by their attorneys, (No Model.) 6 Sheets—Sheet 6.

A. H. METCALF & C. S. GOODING.
SEWING MACHINE.

No. 469,374. Patented Feb. 23, 1892.

WITNESSES:
John R. Snow.
W. H. Elkins.

INVENTORS
Arthur H. Metcalf
and Charles S. Gooding
by their attorneys,
Marsden & Beach.

THE NORRIS PETERS CO., PHOTO-LITHO., WASHINGTON, D. C.

UNITED STATES PATENT OFFICE.

ARTHUR HOBART METCALF, OF PAWTUCKET, RHODE ISLAND, AND CHARLES S. GOODING, OF BROOKLINE, MASSACHUSETTS, ASSIGNORS TO THE CAMPBELL MACHINE COMPANY, OF PAWTUCKET, RHODE ISLAND.

SEWING-MACHINE.

SPECIFICATION forming part of Letters Patent No. 469,374, dated February 23, 1892.

Application filed July 9, 1891. Serial No. 398,901. (No model.)

*To all whom it may concern:*

Be it known that we, ARTHUR HOBART METCALF, of Pawtucket, in the county of Providence and State of Rhode Island, and CHARLES S. GOODING, of Brookline, in the county of Norfolk and State of Massachusetts, have invented an Improved Sewing-Machine, of which the following is a specification, reference being had to the accompanying drawings, in which—

Figure 1:
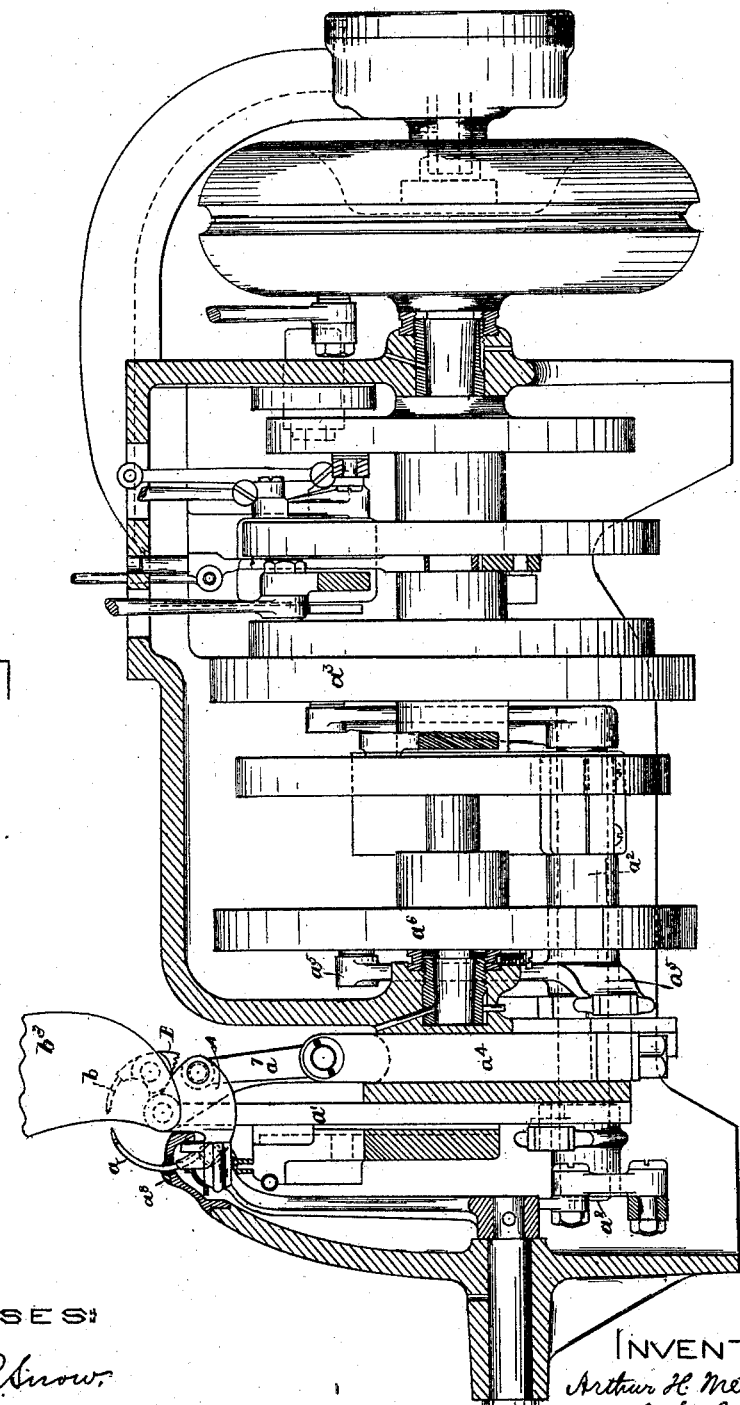
Figure 2:
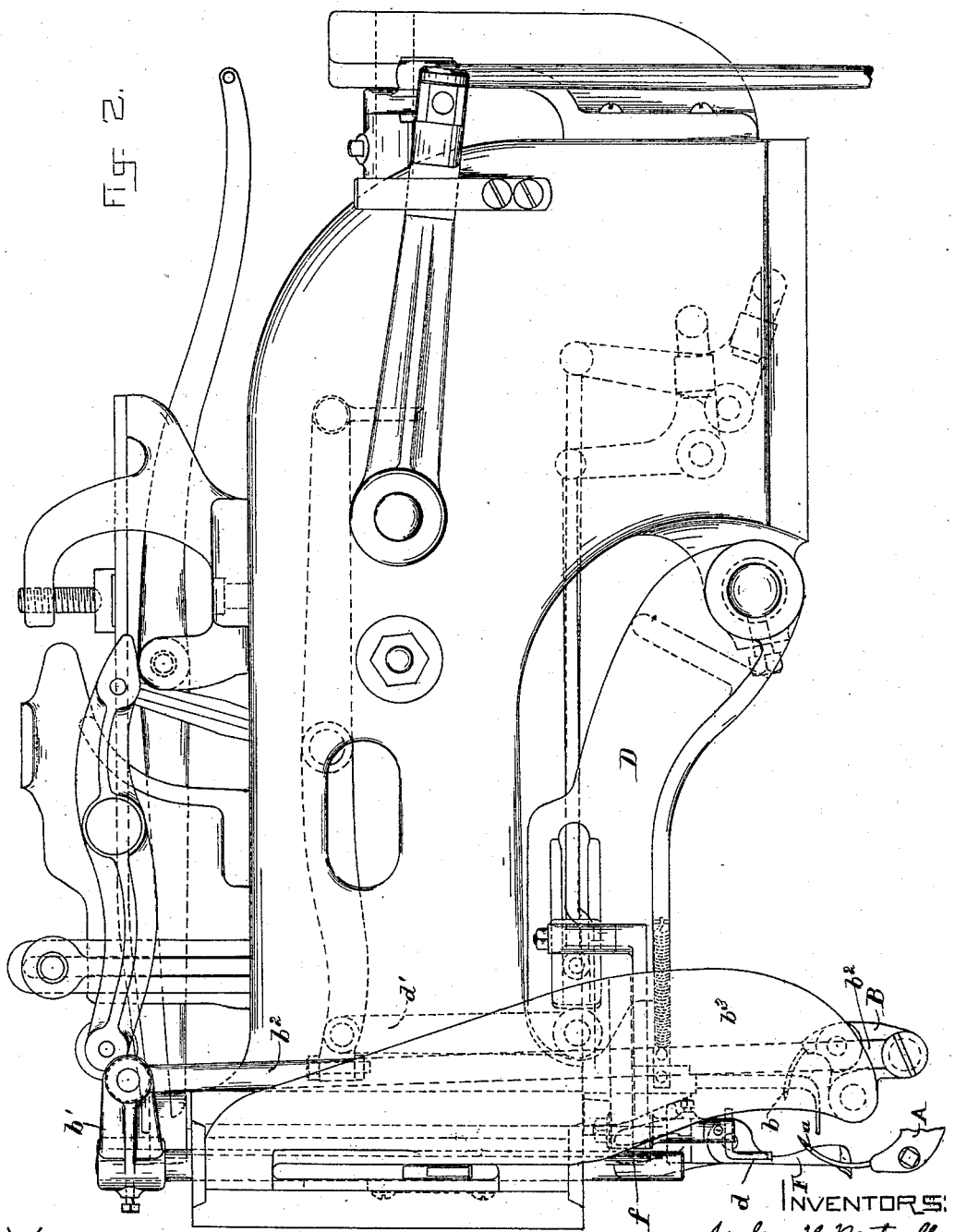
Figure 3:
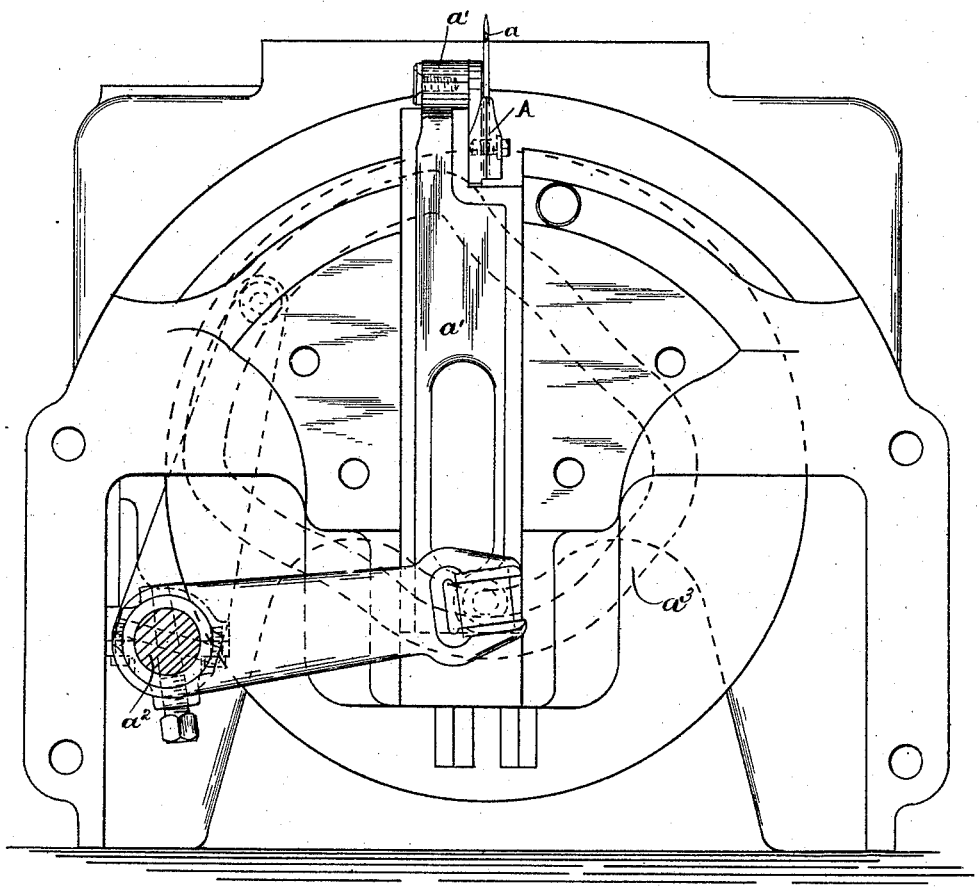
Figure 4:
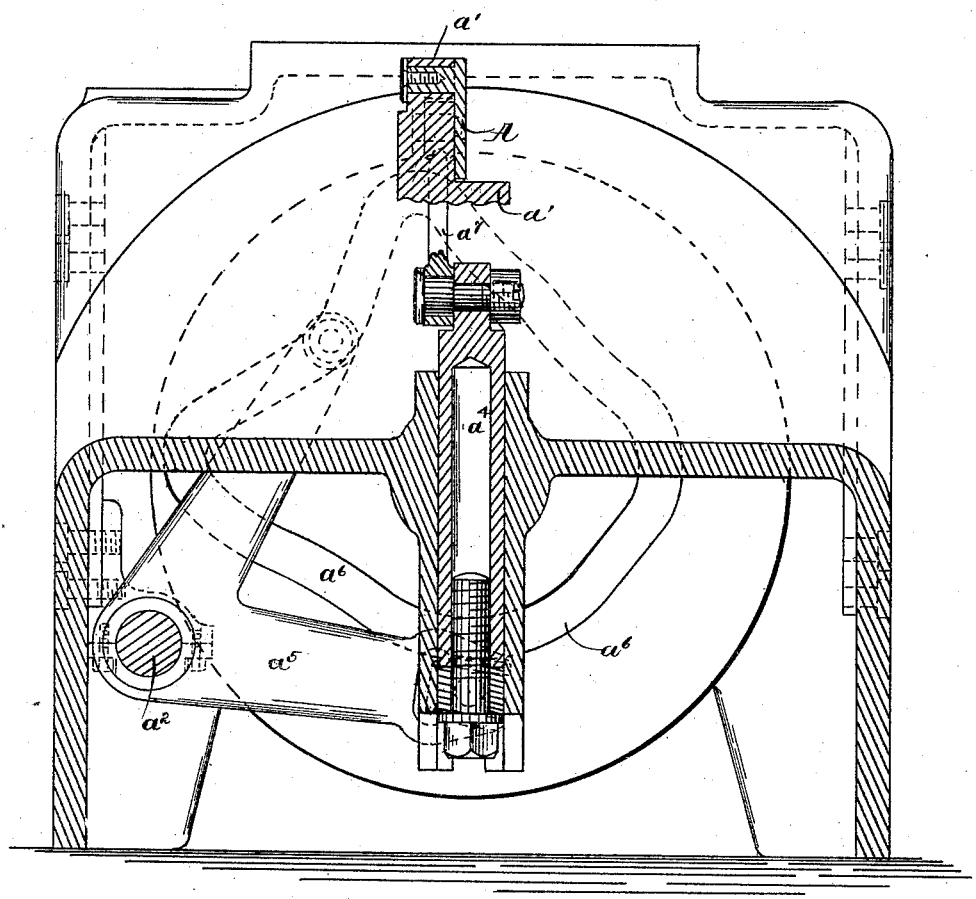
Figure 5:
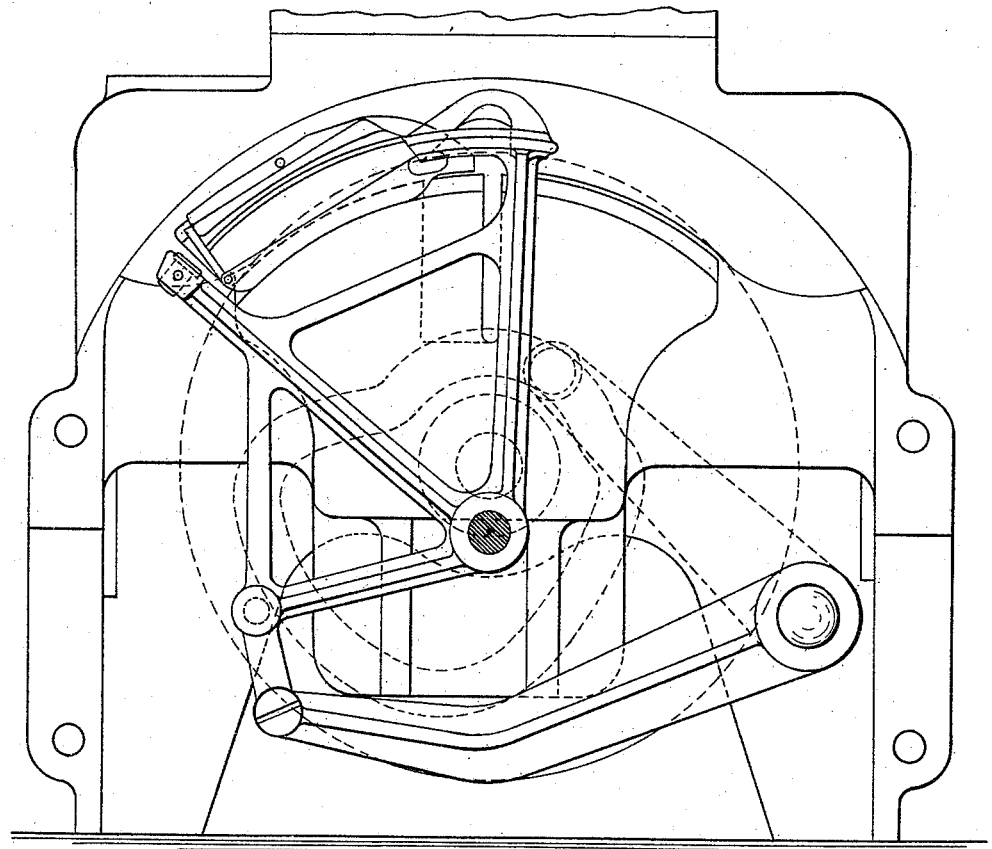
Figure 8:
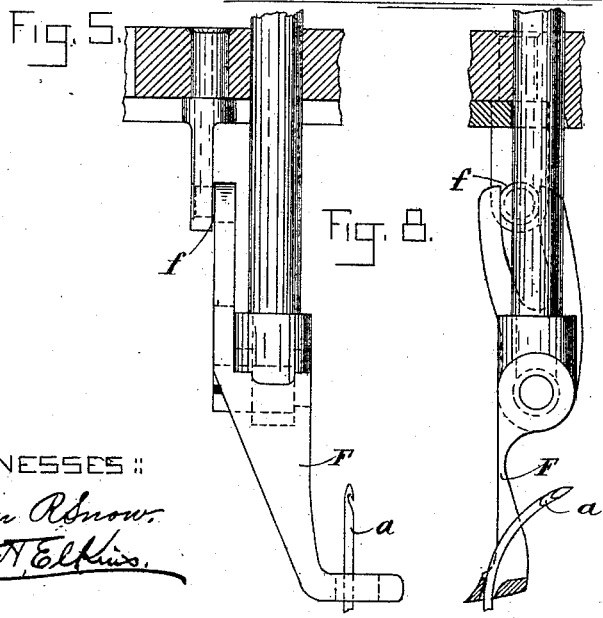
Figure 6:
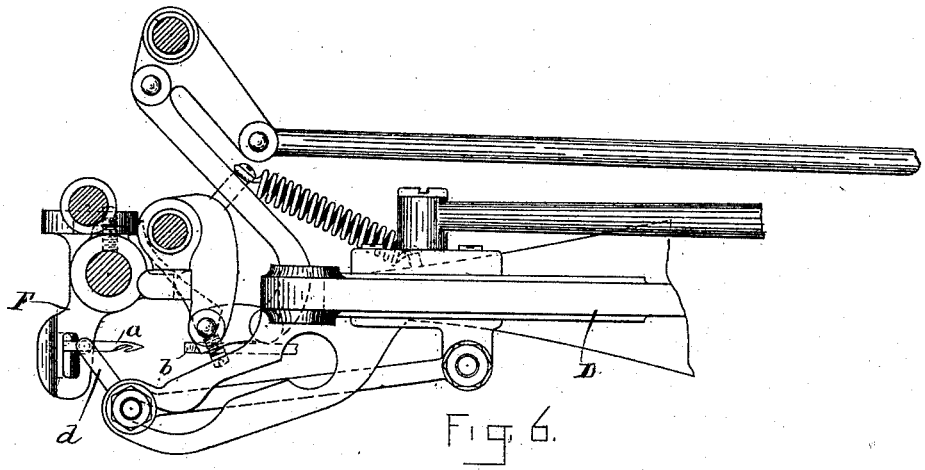
Figure 7:
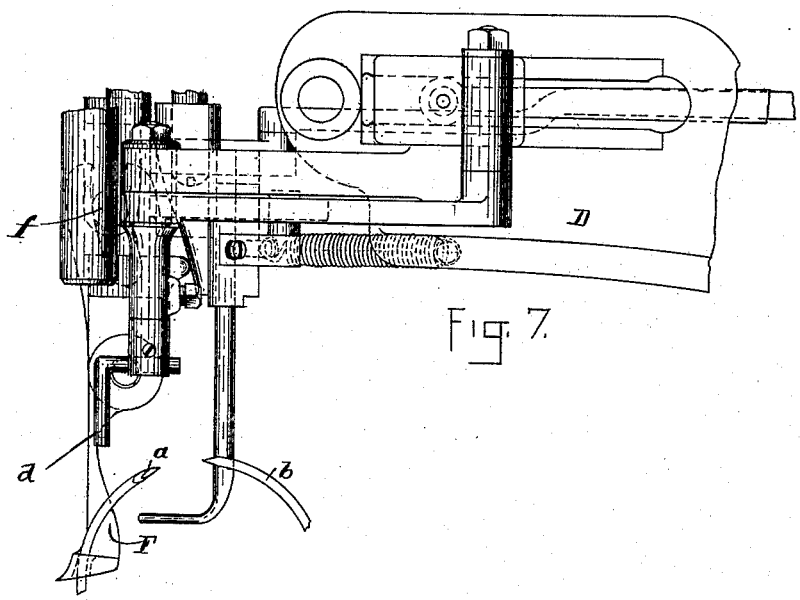

Figure 1 is an elevation with the frame in section illustrating the lower portion of our improved machine; Fig. 2, an elevation of the neck or upper portion on a slightly larger scale than Fig. 1 for greater clearness. Fig. 3 is a front view of the lower portion of the machine with the front plate and shuttle with its adjuncts removed, the needle rock-shaft being shown in section. Fig. 4 is a section on line 4 4 of Fig. 1. Fig. 5 is a front view of the lower portion of the machine with the front plate removed, the needle and its adjuncts omitted. Figs. 6 and 7 are details illustrating the mechanism for operating the thread-arm or thread-eye or looper. Fig. 8 illustrates by a side and front elevation the presser-foot and its adjuncts.

The main feature of our invention is the combination of a shuttle and a curved hooked needle in such a way that the shuttle while traversing the loop passes between the point of the needle and the material. While the combination of a shuttle and a curved hooked needle is not new, yet we are the first to combine a shuttle with a hooked needle which has two distinct motions, one an oscillating motion to cause the needle to traverse the material and the other a motion from and toward the material to carry the needle-point to such a position that the shuttle can pass between it and the material and to return the needle to position for traversing the material by an oscillating motion.

We are aware of Patents No. 93,731, dated August 17, 1869, to Mills, No. 95,571, dated October 5, 1869, to Destouy, and No. 124,393, dated March, 5, 1872, to Stein, which show a curved hooked needle with two distinct motions, one an oscillating motion to traverse the material and the other a motion from and toward the material to tighten the stitch and to return the needle to position for traversing the material; but our combination of a shuttle and its actuating mechanism with a curved hooked needle, its carrier, and mechanism which oscillates the carrier and also moves it from and toward the material is new and of great practical value, as our machine is, in fact, the first machine of its class—that is, the first shuttle-machine with a curved hooked needle—in which the shuttle passes between the point of the needle and the material, thus for the first time combining all the advantages due to the use of a curved hooked needle with all the advantages due to passing the shuttle between the point of the needle and the material.

Another feature of our invention relates to the presser-foot and is fully described below.

In the drawings we show our invention embodied in that form of machine described in patent to Campbell, No. 253,156, dated January 31, 1882, and all the parts not lettered are the same in substance as those fully described in that patent and are too well known to require description.

The needle $a$ is a curved hook-needle connected with its carrier A, and this carrier oscillates with a stud, which is journaled in slide $a'$, as clearly shown in Figs. 3 and 4. The slide $a'$ is reciprocated by the rock-shaft $a^2$, one arm of which is forked to receive a block pivoted to the slide $a'$, as will be clear from Fig. 3, and the other arm is controlled by one of the needle-cams $a^3$, Figs. 1 and 3. By this rock-shaft and its cam the slide $a'$ is reciprocated lengthwise and properly timed, as will be clear, this motion being in substance the usual motion of a straight needle so far as it goes; but it does not of course carry the needle through the material, but only into position, when the oscillation of the needle-carrier A will cause the needle to pass through the material. While the slide $a'$ is in the position shown the plunger $a^4$ is actuated by bell-crank $a^5$, which is controlled by the other needle-cam $a^6$, as clearly shown in Figs. 1 and 4. The bell-crank is shown as supported by shaft $a^2$, but is of course loose upon that shaft, as it must not move with it. The plunger $a^4$ is connected by link $a^7$ with carrier A, so that when the plunger moves while slide $a'$ is stationary the curved needle will pass through the stock, as usual; but as slide $a'$ is moved away from the throat-plate $a^8$ the plunger $a^4$ accompanies it, in order that the carrier may not be oscillated by the relative motion of the slide $a'$ and plunger $a^4$.

The main advantage of this feature of our invention is that we are enabled to move the point of the hook-needle in a curve of a very short radius and also get that motion of the needle which is desirable when a shuttle is used. The point of the curved needle is brought into the same relation with the shuttle as is the point of the straight needle in the Campbell machine, and this—namely, a curved hooked needle which presents its loop to the shuttle substantially as the straight hooked needle of the Campbell machine does—is the distinguishing feature of our invention.

The curved awl $b$ and its carrier B are operated much as usual; but in order to operate the carrier by the awl-bar of the Campbell machine we use a yoke $b'$, fast to the awl-bar of the Campbell machine, and connect that yoke by link $b^2$ with carrier B. Of course no awl will be used with the awl-bar, the curved awl $b$ taking its place. The awl-carrier B is journaled in a bracket $b^3$.

In operation the awl punctures the material, as usual, and feeds as in awl-feed machines, and the needle follows the awl as the awl is withdrawn. While the needle is in the material the thread is placed in its hook by the thread-eye $d$, and a bight is formed in the thread between the material and the hook of the needle by the action of the thread-eye, aided by the thread-arm, as in the Campbell patent; but in the machine shown the details of construction are such that the eye must move vertically in addition to its horizontal movements, and this is provided for by pivoting the bracket D to the frame of the machine and controlling the outer end of the bracket D by a link $d'$ from the presser-foot lever.

The presser-foot F is hinged to the presser-foot bar and is slotted at its outer end, which slot engages a pin $f$, fast to the frame of the machine, so that as the presser-foot moves in relation to the needle this slot and its pin $f$ causes the inner end of the presser-foot to move in the curved path of the needle. This is a feature of our invention of considerable importance in certain classes of work. As the point of both needle and awl moves in a curved path through the slot or throat of the presser-foot, it would be necessary to make this slot much wider than the diameter of the needle or awl, or to cut away one side of the slot altogether were the presser-foot rigidly attached to its bar; but by hinging the presser-foot to its bar the position of its slot with relation to the curved path of the needle and awl is so governed by the cam-slot and its stud that the slot will always be in place for the passage of the needle and awl. Moreover, in sewing on the outer sole to a shoe with the last in it it is often desirable that the presser-foot should move laterally as it rises, for the reason that at some parts of the work the presser-foot would strike the lasted shoe and throw it out of place if the presser-foot did not move laterally as it rose.

What we claim as our invention is—

1. In combination, a shuttle, its actuating mechanism, a curved hook-needle, its carrier, and mechanism for moving the needle-carrier toward and from the material and for oscillating it to cause the needle to traverse the material, combined and operating substantially as and for the purpose specified.

2. In a sewing-machine, a presser-foot hinged to its bar with a cam fast to the shank of the presser-foot and a stationary cam-stud, substantially as described.

ARTHUR HOBART METCALF.
CHARLES S. GOODING.

Witnesses:
J. E. MAYNADIER,
EDWARD S. BEACH.